Sept. 22, 1953  T. L. PETERS ET AL  2,652,789
CANDY MOLDING MACHINE
Filed Sept. 11, 1950

TENAL L. PETERS
ANTHONY GEORGE
LEE STIDHAM
*INVENTORS*

BY *Herbert J. Brown*

ATTORNEY

Patented Sept. 22, 1953

2,652,789

UNITED STATES PATENT OFFICE 2,652,789

CANDY MOLDING MACHINE

Tenal L. Peters, Anthony George, and Lee Stidham, Tyler, Tex.

Application September 11, 1950, Serial No. 184,292

1 Claim. (Cl. 107—8)

This invention relates to candy making, and has reference to a machine for molding various confections, such as peanut patties, mint wafers, and other candies capable of being molded.

An object of the invention is to provide a machine for molding candy and the like which will reduce the breakage incurred as a result of removing the formed pieces from the molds by hand or with hand tools.

Another object of the invention is to provide a conveyor type molding machine in which the candy is not subjected to bending or other disturbances which will cause breakage while it is changing from a liquid to a solid condition.

A further object of the invention is to provide a machine of the described class which will effect a substantial saving in labor costs.

The invention will be more readily understood by reference to the accompanying drawings and the following description.

Figure 1:
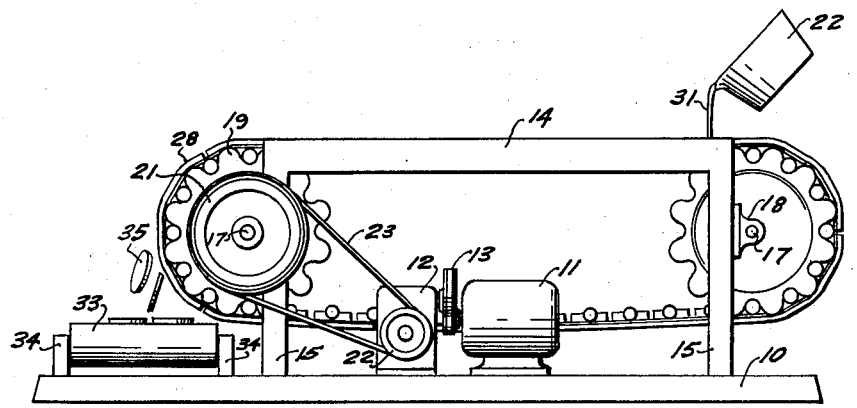
Figure 1 is a side elevation of a conveyor type candy molding machine embodying the features of the present invention.
Figure 2:
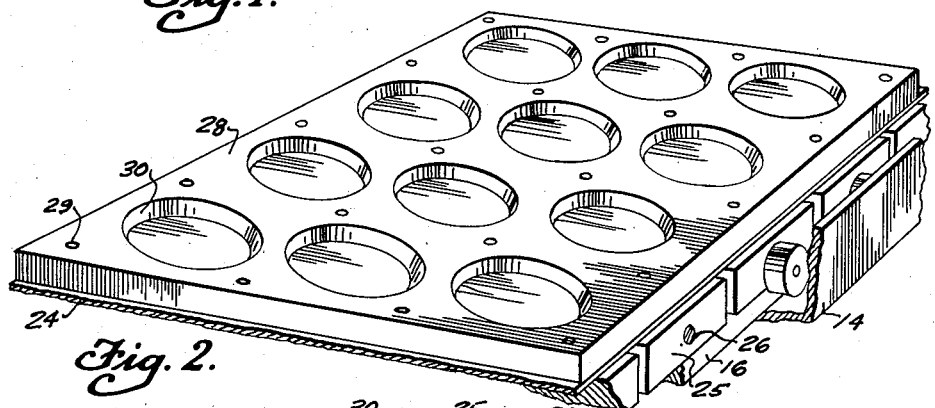
Figure 2 is an enlarged perspective view of one of the molds of the machine illustrated in Figure 1, and showing the supporting parts of the mold in broken section.
Figure 3:
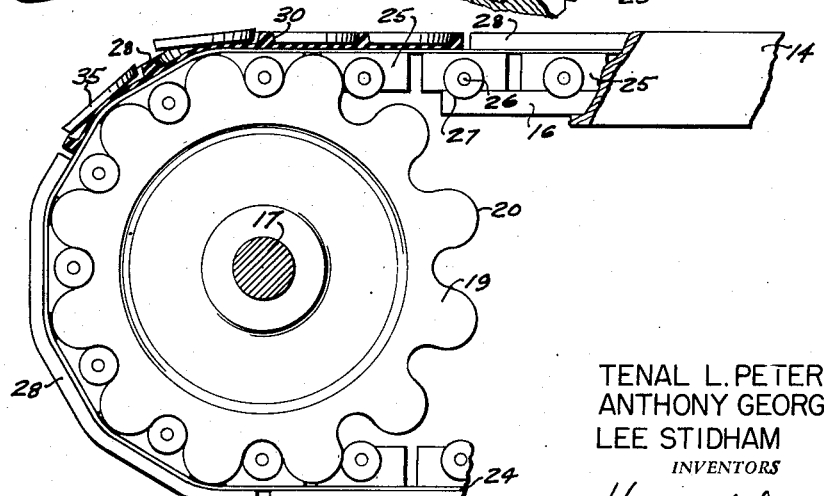
Figure 3 is an enlarged broken side elevation of the discharge end of the machine illustrated in Figure 1.

The form of the invention shown includes a base 10 having a motor 11 and a reducing gear box 12 mounted thereon, together with a drive belt 13 connecting the latter. Channel shaped side members 14 are secured between the upper ends of legs 15 vertically mounted on the base 10. Although not shown in the drawings, the channels 14 are parallel with respect to each other and are arranged for supporting a table 16 or other flat horizontal supporting surface therebetween. Parallel shafts 17 are mounted on the legs 15 and are outwardly positioned with respect to the ends of the supporting side members 14 by means of bearings 18. Pairs of sprockets 19 having relatively large teeth 20 are mounted on each shaft 17, and one of the shafts 17 is provided with a driven pulley 21 which is connected with the driving pulley 22 of the gear box 12 by means of a belt 23. There is a wide endless belt 24 having spaced transverse cross members 25 connected to its inner surface, and which cross members are rectangular in cross section. The outer end of each cross member 25 is provided with a projecting stub shaft 26 having a roller 27 mounted thereon. The length of the cross members 25 is such that the roller 27 will fit between the teeth 20 of the sprockets 19.

Rectangular elastic molds 28 are secured to the outer surface of the wide belt 24, as by means of rivets 29, and each mold has cavities 30 in its outer surface into which the candy is poured while in its liquid form. As shown in Figure 1, the liquid candy 31 is poured from a ladle 32. A conveyor belt 33 may be provided on the base 10 at the end thereof opposite the ladle 22 and transversely positioned with respect to the length of the wide belt 24. As shown in Figure 1, a conveyor belt 33 is partially positioned beneath the adjacent pair of sprockets 19, and is supported by legs 34.

In operation, the liquid candy 31 is poured into the cavities 30 at the end of the machine opposite the conveyor belt 33, and by means of the motor 11, the driven pulley 21 is turned in a direction to cause the upper row of molds 28 to move toward the conveyor belt 33. During the last referred to movement the liquid candy 31 solidifies or hardens to form candies or confections 35. By reason of the supporting table 16 the upper portion of the belt 24 and the molds 28 carried thereon are prevented from sagging or bending, and whereby the solidifying liquid candy is prevented from breaking. As the solidified candy 35 approaches the end of the machine, the convex bending action of the belt 24 and the molds 28 carried thereon is such that the edges of the candy pieces 35 are loosened in the cavities 30 by the action of the cross members 25 as the latter conform with the curve of the sprocket 19. The solidified candy 35 then drops on the conveyor belt 33, where it is moved to a packaging station, not shown.

The present invention is not limited to the specific construction herein shown and described, but may be made in many ways within the scope of the appended claim.

What is claimed is:

In a candy molding machine, parallel shafts rotatably supported in substantially the same horizontal plane, a pair of sprockets supported on each said shaft, the corresponding sprockets on each end of said shafts being in alignment with each other, an endless belt adapted to be supported between and around said sprockets, at least one flexible cavity mold secured to the outer surface of said belt, rectangular cross members substantially as wide as the cavity of said mold transversely secured to the inner surface of said belt, at least one of said cross members having one longitudinal edge thereof positioned beneath the bottom of the cavity of said mold when the latter is on the top of said endless belt, stub shafts projecting from the ends of said cross members and positioned to be received between the teeth of said sprockets, a horizontal surface slidably supporting said cross members along the upper length of said belt, and means driving said belt along its length.

TENAL L. PETERS.
ANTHONY GEORGE.
LEE STIDHAM.

References Cited in the file of this patent

UNITED STATES PATENTS

| Number | Name | Date |
|---|---|---|
| 356,450 | Coleman | Jan. 25, 1887 |
| 1,783,402 | Cahoon | Dec. 2, 1930 |
| 1,839,731 | Baum | Jan. 5, 1932 |
| 1,883,482 | Bausman et al. | Oct. 18, 1932 |
| 2,240,214 | Heidelmeyer et al. | Apr. 29, 1941 |
| 2,448,786 | Faxon | Sept. 7, 1948 |